United States Patent
Kimmerly

(10) Patent No.: US 7,283,991 B1
(45) Date of Patent: Oct. 16, 2007

(54) CACHING SYSTEM FOR PATH SEARCH OPTIMIZATION

(75) Inventor: Randy S. Kimmerly, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/266,675

(22) Filed: Mar. 11, 1999

(51) Int. Cl.
*G06F 7/00* (2006.01)
*G06F 9/44* (2006.01)

(52) U.S. Cl. ............ 707/3; 707/4; 707/5; 707/10; 717/162; 717/166; 709/202; 709/203; 709/232; 709/229

(58) Field of Classification Search ............ 707/1–10, 707/200, 203, 204, 100–104.1; 709/202–203, 709/316, 226, 328, 330–332, 231, 236, 232, 709/229; 717/1, 6, 11, 114–116, 166, 130, 717/109, 113, 162, 151, 3, 9, 203–204; 711/114–116, 711/162–167, 120–121, 203, 207
See application file for complete search history.

(56) References Cited

U.S. PATENT DOCUMENTS

| | | | | |
|---|---|---|---|---|
| 4,317,168 A | * | 2/1982 | Messina et al. | 711/143 |
| 4,332,010 A | * | 5/1982 | Messina et al. | 711/3 |
| 4,394,731 A | * | 7/1983 | Flusche et al. | 711/145 |
| 4,400,770 A | * | 8/1983 | Chan et al. | 711/3 |
| 4,484,267 A | * | 11/1984 | Fletcher | 711/124 |
| 4,905,141 A | * | 2/1990 | Brenza | 711/129 |
| 5,151,989 A | * | 9/1992 | Johnson et al. | 707/10 |
| 5,187,786 A | * | 2/1993 | Densmore et al. | 707/3 |
| 5,537,574 A | * | 7/1996 | Elko et al. | 711/141 |
| 5,581,760 A | * | 12/1996 | Atkinson et al. | 717/108 |
| 5,619,710 A | * | 4/1997 | Travis et al. | 709/203 |
| 5,822,580 A | * | 10/1998 | Leung | 707/103 R |
| 5,893,118 A | * | 4/1999 | Sonderegger | 707/200 |
| 5,920,725 A | * | 7/1999 | Ma et al. | 717/171 |
| 5,923,878 A | * | 7/1999 | Marsland | 717/139 |
| 5,937,411 A | * | 8/1999 | Becker | 707/103 R |
| 5,966,702 A | * | 10/1999 | Fresko et al. | 707/1 |
| 5,987,608 A | * | 11/1999 | Roskind | 713/200 |
| 6,016,392 A | * | 1/2000 | Jordan | 709/328 |
| 6,061,743 A | * | 5/2000 | Thatcher et al. | 707/104.1 |
| 6,078,924 A | * | 6/2000 | Ainsbury et al. | 707/101 |
| 6,085,030 A | * | 7/2000 | Whitehead et al. | 709/203 |
| 6,085,198 A | * | 7/2000 | Skinner et al. | 707/103 R |
| 6,086,030 A | * | 7/2000 | Hepworth | 248/215 |
| 6,169,992 B1 | * | 1/2001 | Beall et al. | 707/103 R |
| 6,199,082 B1 | * | 3/2001 | Ferrel et al. | 707/522 |
| 6,212,564 B1 | * | 4/2001 | Harter et al. | 709/228 |

(Continued)

*Primary Examiner*—Cam Y Truong
*Assistant Examiner*—Anh Ly
(74) *Attorney, Agent, or Firm*—Woodcock Washburn LLP

(57) ABSTRACT

Location of classes is facilitated by caching information about classes in a class path. The cache is reconstructed when changes to the original information in the class path are detected. Selected elements in a class path can also be cached. These elements are selected as those which have associated mechanisms to provide notification of changes. Element selection criteria can be modified such that only class path elements that are least likely to be changed are cached, and for which changes are easy to detect, such as ZIP files. A class path manager is used to create caches for selected class path elements on instantiation of the path manager. The class path manager creates a wrapper for each element in the class path to provide a level of indirection when calls are made to determine the location of a class.

16 Claims, 5 Drawing Sheets

U.S. PATENT DOCUMENTS

| | | | |
|---|---|---|---|
| 6,216,152 B1* | 4/2001 | Wong et al. | 709/203 |
| 6,230,184 B1* | 5/2001 | White et al. | 709/201 |
| 6,233,601 B1* | 5/2001 | Walsh | 709/202 |
| 6,237,135 B1* | 5/2001 | Timbol | 717/1 |
| 6,243,856 B1* | 6/2001 | Meyer et al. | 717/1 |
| 6,243,865 B1* | 6/2001 | Wei et al. | 725/41 |
| 6,247,020 B1* | 6/2001 | Minard | 707/104.1 |
| 6,263,377 B1* | 7/2001 | Monday et al. | 709/320 |
| 6,263,496 B1* | 7/2001 | Meyer et al. | 717/114 |
| 6,269,373 B1* | 7/2001 | Apte et al. | 707/10 |
| 6,272,650 B1* | 8/2001 | Meyer et al. | 714/38 |
| 6,314,558 B1* | 11/2001 | Angel et al. | 717/118 |
| 6,321,261 B1* | 11/2001 | Glass | 709/223 |
| 6,324,688 B1* | 11/2001 | Brown et al. | 717/148 |
| 6,330,709 B1* | 12/2001 | Johnson et al. | 717/100 |
| 6,378,126 B2* | 4/2002 | Tang | 717/143 |
| 6,385,769 B1* | 5/2002 | Lewallen | 717/125 |
| 6,401,241 B1* | 6/2002 | Taylor | 717/174 |
| 6,430,556 B1* | 8/2002 | Goldberg et al. | 707/4 |
| 6,430,570 B1* | 8/2002 | Judge et al. | 707/103 R |
| 6,430,730 B1* | 8/2002 | Ghatate et al. | 716/4 |
| 6,442,620 B1* | 8/2002 | Thatte et al. | 719/316 |
| 6,470,494 B1* | 10/2002 | Chan et al. | 717/166 |
| 6,519,594 B1* | 2/2003 | Li | 707/10 |
| 6,530,080 B2* | 3/2003 | Fresko et al. | 717/166 |
| 6,609,146 B1* | 8/2003 | Slotznick | 709/200 |
| 6,633,888 B1* | 10/2003 | Kobayashi | 707/103 R |
| 6,654,765 B2* | 11/2003 | Wong et al. | 707/103 R |
| 6,654,954 B1* | 11/2003 | Hicks | 717/162 |
| 6,715,145 B1* | 3/2004 | Bowman-Amuah | 718/101 |
| 6,738,975 B1* | 5/2004 | Yee et al. | 719/310 |
| 6,748,396 B2* | 6/2004 | Klicnik et al. | 707/103 Y |
| 2001/0047510 A1* | 11/2001 | Angel et al. | 717/4 |
| 2002/0007357 A1* | 1/2002 | Wong et al. | 707/1 |
| 2002/0042833 A1* | 4/2002 | Hendler et al. | 709/231 |
| 2002/0049865 A1* | 4/2002 | Charnell et al. | 709/315 |
| 2002/0184226 A1* | 12/2002 | Klicnik et al. | 707/100 |
| 2004/0111730 A1* | 6/2004 | Apte | 719/330 |
| 2004/0133882 A1* | 7/2004 | Angel et al. | 717/130 |
| 2004/0144882 A1* | 7/2004 | Small et al. | 242/559 |
| 2004/0261069 A1* | 12/2004 | Verbeke et al. | 717/166 |
| 2006/0070051 A1* | 3/2006 | Kuck et al. | 717/162 |
| 2006/0122962 A1* | 6/2006 | Ushiku | 707/1 |

* cited by examiner

CACHING SYSTEM FOR PATH SEARCH OPTIMIZATION

FIELD OF THE INVENTION

This invention relates generally to the field of searching for information in a computer system and in particular to caching of information related to finding classes.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright® 1999, Microsoft Corporation, All Rights Reserved.

BACKGROUND

A class is the fundamental element of Java systems. They provide functions that support application programs and other programs that are written by developers. The classes, which may number in the thousands, reside in class files, which essentially are groupings of classes in containers. The containers may take a number of forms, typically including file system directories, archive files such as ZIP and JAR files, and in the case of Microsoft Corporation's Java VM implementation, they may also appear in a database of installed classes referred to as a Java Package Manager, which manages many attributes about the classes such as version, security and others. Any combination of these containers of classes, referred to as class path elements, can be put together in an order dependent list, known as the class path.

A class path is defined by use of an environment variable called ClassPath. ClassPath is used to define the order and places to search for classes when in an execution environment and in development environments. A class locator service, known as WS, or the Java Package Service, exposes an API which describes the class path as a single class source, with methods such as FindClass and EnumClasses regardless of the current configuration of the class path. These methods final all classes with a given name in all or a specified package, and enumerate all classes of given name respectively. However, they currently search through all the classes identified by the class path. When a JPS instance is created, it is initialized with a list of class path elements. For each element, a root object is created which represents the contents of the element. This object exposes an interface called IRoot, which has simple class location/enumeration methods, such as DoesClassExist, GetClass, and EnumClasses, each of which do what their names imply. Depending on the type of the element, a different implementation of a root object is created. For directory elements, a direct root object is created, whose IRoot method implementations result in direct searches of the root's underlying file system directory. For other elements, a root implementation that performs caching is created.

Since there are literally thousands of classes available for use when developing applications, it can be difficult to keep track of them. Further, many different containers are available from different companies or other organizations to support programming in Java. Each of the different containers may have classes with similar names and similar functions. In a development environment, it is necessary for a class location system to provide a list of all the existing classes to help the developer select a desired class for use. When a developer is writing or modifying an application, the list can be useful to help the developer determine which class to select.

There are three significant differences in the way that a class locator service is utilized in the development environment as opposed to the execution environment. First, the Java compiler must verify that classes do not appear in certain locations, and therefore must make requests for classes that probably do not exist. Second, the development environment must provide lists of all available classes in given packages, where a package is an organized sub-container of classes. These classes are referred to by their package name plus their class name. And, finally, the development environment needs to inspect a small portion of each class found to provide and display more detailed information about the class, such as its fields, methods and attributes.

Each of these three differences place a different efficiency requirement on the class locator. First, unsuccessful searches are speed critical. Second, fast enumeration of all classes is required. Third, the interesting information about a class must be easily and quickly obtainable from each class located. There is a need for a class location mechanism that can find classes in a fast and efficient manner. There is a further need for such a mechanism that operates with existing development environments.

SUMMARY OF THE INVENTION

Location of classes is facilitated by caching information about the classes in a class path comprising different collections of classes or places to search for classes. This cached information provides a much quicker way of searching for a class which is needed for instantiation and execution. The cache is constructed during non-speed critical times so that it is available for fast location of classes when needed. The cache is reconstructed when changes to the original information in the class path are detected.

In one aspect of the invention, only selected elements in a class path are cached. These elements are selected as those which have associated mechanisms to provide notification of changes. In this manner, the integrity of the cache can be maintained with little overhead involved in independent tracking of the class path elements. By keeping separate caches, reconstruction of a cache due to a detected change is limited to that cache only. Further the selection criteria can be modified such that only class path elements that are least likely to be changed are cached, and for which changes are easy to detect. This allows selectivity of elements to cache based on the overhead associated with caching the element.

In a further aspect of the invention, a class path manager is used to create caches for selected class path elements on instantiation of the path manager. It first parses the path into names of elements, and then decides whether the element is viable for caching. In one embodiment, only ZIP files are cached due to the ease of detection of change. The class path manager creates a wrapper for each element in the class path as identified by a classpath environment variable. The wrapper is used to provide a level of indirection when calls are made to determine the location of a class. If the element is not one which is viable to cache, standard system services are invoked to perform a search of the path of that element. If the element is one for which caching is viable, a caching wrapper is created which invokes methods to search the cache for that element. The indirection provided by the wrappers allows multiple different types of caches to be provided for elements without increasing the complexity of the class path manager, nor changing the normal calls from applications that need to find the class.

One example of a call that utilizes a cache is a code completion call. When a user is using an editor for writing a program and reaches a common delimiter, such as a period or space, it generates a code completion call, which the class path manager receives, and invokes each wrapper corresponding to elements in the class path. Given the information prior to the delimiter, classes matching or meeting that portion of the information are provided by using standard system services to search uncached elements, or by cache dependent search services for elements having a cache. Such elements currently comprise ZIP files, which can represent a significant number of the classes to be searched, and hence result in significant performance improvements.

DETAILED DESCRIPTION

In the following detailed description of exemplary embodiments of the invention, reference is made to the accompanying drawings which form a part hereof, and in which is shown by way of illustration specific exemplary embodiments in which the invention can be practiced. These embodiments are described in sufficient detail to enable those skilled in the art to practice the invention, and it is to be understood that other embodiments can be utilized and that logical, mechanical, electrical and other changes can be made without departing from the spirit or scope of the present invention. The following detailed description is, therefore, not to be taken in a limiting sense, and the scope of the present invention is defined only by the appended claims.

The detailed description is divided into multiple sections. A first section describes the operation of a computer system which implements the current invention of caching class information. This is followed by a description of a cache used to store information about elements in a class path, the use of separate caches for selected elements of the class path, and a method of indirection to permit the use by a development system of standard methods to find and enumerate classes. The operation of a class path manager in association with element wrappers to provide such indirection is then described followed by examples of the use of the class path manager to create and manage caches for selected class path elements. This is followed by a conclusion which describes some potential benefits and describes further alternative embodiments.

Hardware and Operating Environment

Figure 1:
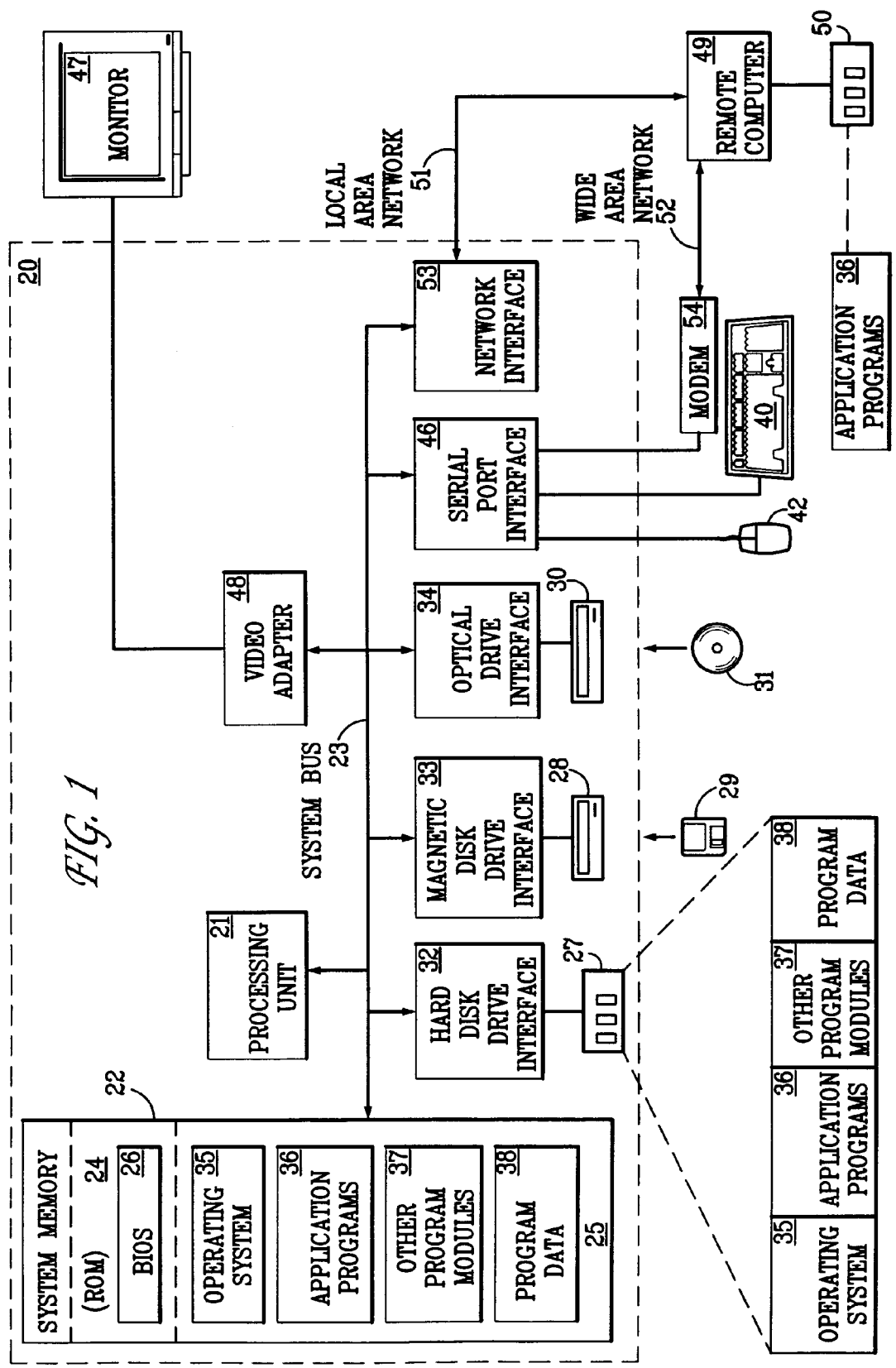
FIG. 1 is a block diagram of a computer system on which the present invention can be implemented.

FIG. 1 provides a brief, general description of a suitable computing environment in which the invention can be implemented. The invention will hereinafter be described in the general context of computer-executable program modules containing instructions executed by a personal computer (PC). Program modules include routines, programs, objects, components, data structures, etc. that perform particular tasks or implement particular abstract data types. Those skilled in the art will appreciate that the invention can be practiced with other computer-system configurations, including hand-held devices, multiprocessor systems, microprocessor-based programmable consumer electronics, network PCs, minicomputers, mainframe computers, and the like which have multimedia capabilities. The invention can also be practiced in distributed computing environments where tasks are performed by remote processing devices linked through a communications network. In a distributed computing environment, program modules can be located in both local and remote memory storage devices.

FIG. 1 shows a general-purpose computing device in the form of a conventional personal computer 20, which includes processing unit 21, system memory 22, and system bus 23 that couples the system memory and other system components to processing unit 21. System bus 23 can be any of several types, including a memory bus or memory controller, a peripheral bus, and a local bus, and can use any of a variety of bus structures. System memory 22 includes read-only memory (ROM) 24 and random-access memory (RAM) 25. A basic input/output system (BIOS) 26, stored in ROM 24, contains the basic routines that transfer information between components of personal computer 20. BIOS 26 also contains start-up routines for the system. Personal computer 20 further includes hard disk drive 27 for reading from and writing to a hard disk (not shown), magnetic disk drive 28 for reading from and writing to a removable magnetic disk 29, and optical disk drive 30 for reading from and writing to a removable optical disk 31 such as a CD-ROM or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer can also be used in the exemplary operating environment. Such media can include magnetic cassettes, flash-memory cards, digital versatile disks, Bernoulli cartridges, RAMs, ROMs, and the like.

Program modules can be stored on the hard disk, magnetic disk 29, optical disk 31, ROM 24 and RAM 25. Program modules can include operating system 35, one or more application programs 36, other program modules 37, and program data 38. A user can enter commands and information into personal computer 20 through input devices such as a keyboard 40 and a pointing device 42. Other input devices (not shown) can include a microphone, joystick, game pad, satellite dish, scanner, or the like. These and other input devices are often connected to the processing unit 21 through a serial-port interface 46 coupled to system bus 23; but they can be connected through other interfaces not shown in FIG. 1, such as a parallel port, a game port, or a universal serial bus (USB). A monitor 47 or other display device also connects to system bus 23 via an interface such as a video adapter 48. In addition to the monitor, personal computers typically include other peripheral output devices (not shown) such as speakers and printers.

Personal computer 20 can operate in a networked environment using logical connections to one or more remote computers such as remote computer 49. Remote computer 49 can be another personal computer, a server, a router, a network PC, a peer device, or other common network node. It typically includes many or all of the components described above in connection with personal computer 20; however, only a storage device 50 is illustrated in FIG. 1. The logical connections depicted in FIG. 1 include local-area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 can be internal or external to PC 20, and connects to system bus 23 via serial-port interface 46. In a networked environment, program modules, such as those comprising Microsoft® Word which are depicted as residing within 20 or portions thereof can be stored in remote storage device 50. Of course, the network connections shown are illustrative, and other means of establishing a communications link between the computers can be substituted.

Software can be designed using many different methods, including object oriented programming methods. C++ and Java are two examples of common object oriented computer programming languages that provide functionality associated with object oriented programming. Object oriented programming methods provide a means to encapsulate data members (variables) and member functions (methods) that operate on that data into a single entity called a class. Object oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in one embodiment.

An interface is a group of related functions that are organized into a named unit. Each interface can be uniquely identified by some identifier. Interfaces have no instantiation, that is, an interface is a definition only without the executable code needed to implement the methods which are specified by the interface. An object can support an interface by providing executable code for the methods specified by the interface. The executable code supplied by the object must comply with the definitions specified by the interface. The object can also provide additional methods. Those skilled in the art will recognize that interfaces are not limited to use in or by an object oriented programming environment.

Cache Implementation

A class path is defined by use of an environment variable called ClassPath. ClassPath is used to define the order and places to search for classes when in an execution environment and in development environments. A class locator service, known as JPS, or the Java Package Service, exposes an API which describes the class path as a single class source, with methods such as FindClass and EnumClasses regardless of the current configuration of the class path. These methods final all classes with a given name in all or a specified package, and enumerate all classes of given name respectively. However, they currently search through all the classes identified by the class path. When a JPS instance is created, it is initialized with a list of class path elements. For each element, a root object is created which represents the contents of the element. This object exposes an interface called Root, which has simple class location/enumeration methods, such as DoesClassExist, GetClass, and EnumClasses, each of which do what their names imply. Depending on the type of the element, a different implementation of a root object is created. For directory elements, a direct root object is created, whose IRoot method implementations result in direct searches of the root's underlying file system directory. For other elements, a root implementation that performs caching is created.

Figure 2:
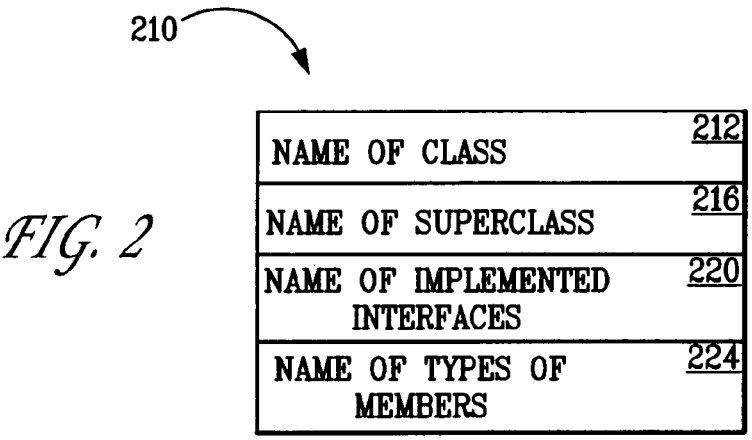
FIG. 2 is a block diagram of a cache of information related to classes stored on the computer system of FIG. 1.

In FIG. 2, a block diagram of the contents of a cache 210 contains cached information for each class in a selected class path which is useful in performing the functions provided by the above methods. The cached information for each class comprises a name of the class 212, a name of a super class 216, names of implemented interfaces 220 and names of types of members 224. The super class name provides the ability to track inheritance between classes, and the names of the types of members includes information identifying methods and fields of the class. In any event, the information contained in the cache is a minimum amount of information required to determine the location of classes and to enumerate all the classes in a particular class path.

Figure 3:
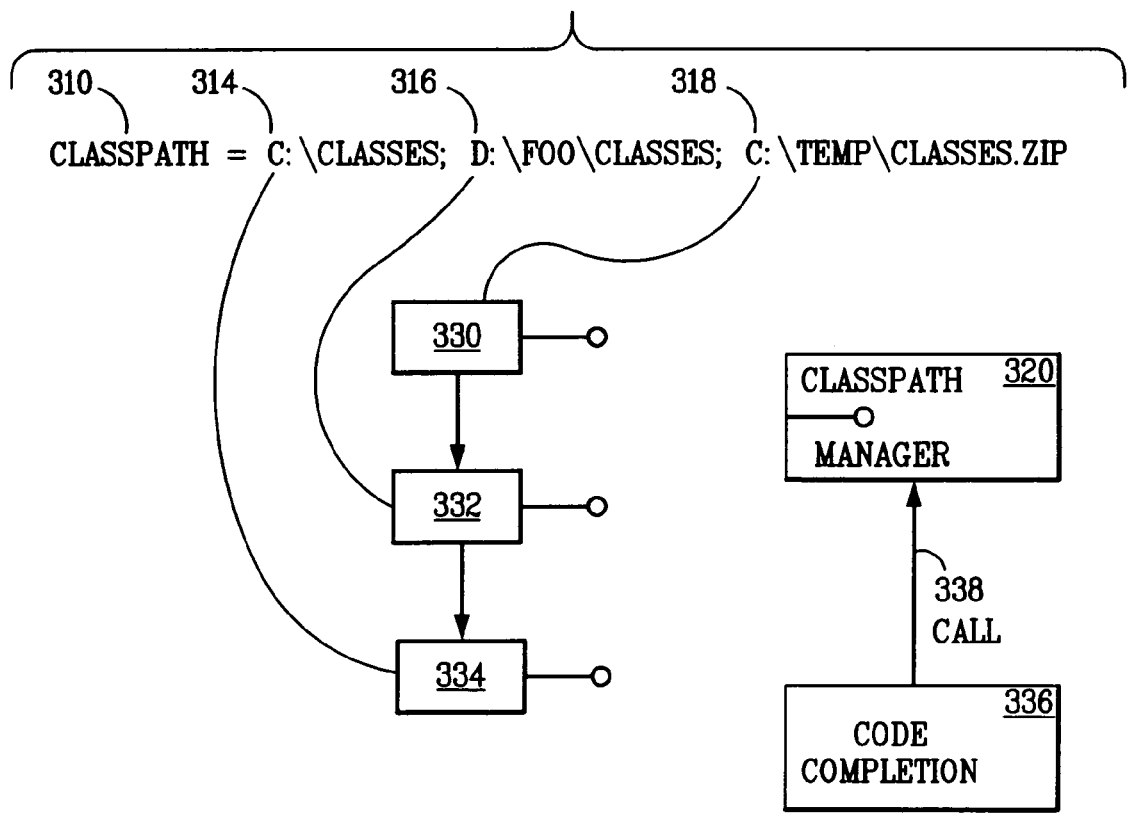
FIG. 3 is a block diagram showing interaction of a class path manager with caches of elements in a class path.

An example of a ClassPath definition is provided in FIG. 3 at 310, which sets the ClassPath 310 equal to C:\classes at 314, D:\foo\classes at 316 and c:\temp\classes.zip at 318. Each of these is referred to as class path elements, which define places to search for classes. Class path elements 314 and 316 are directory structures, while element 318 is a ZIP file. ZIP files contain a manifest of files in the ZIP file. To create the cache for classes in a ZIP file, the manifest is used to identify class files. The class files are then loaded and information needed to create the cache entries is extracted and loaded into the cache. The ZIP file is then closed. Compressed ZIP files can also be handled with the additional steps of decompressing and then compressing again when closing the files. Encrypted files can also be handled in a similar manner if a password is provided by the user.

In one embodiment, a hash table can be used to represent the information that is cached. A unique ID (identifier) for each Name can be used, which is shorter than the actual name itself. Further entries can refer to the ID as opposed to the name, making the table more efficient. The cache can be in the form of a flat file, a relational database, or other format as desired. The type of cache used can be optimized if desired depending on the type of element.

A class path manager 320 is used to create wrappers 330, 332, and 334. Each wrapper is used to provide a level of indirection from the application program interfaces (APIs) used by the class locator service provided by Java. In other words, calls to such APIs, such as from a code completion class function 336 (a function which provides potential completions of statements that are being entered), are received by the class path manager 320 and provided to the wrappers for application to the class path elements. In one embodiment of the invention, each class path element can have an independent cache containing the same information as the cache in FIG. 2. The use of such an independent cache for each element allows the cache to be used or not used depending on the viability of the cache for each type of element. In one embodiment, only ZIP files or similar files are provided with a cache due to the ease of which detection of changes can be tracked. Ease of such detection ensures that the cache can be timely updated prior to any searching for classes or enumeration of classes. Further considerations include whether or not the element is likely to be changed or is stable. This can be weighed against the difficulty of tracking whether a change has or has not occurred, and even against the performance benefits obtained by use of the cache for a particular element, which can be significant. In one case, the use of the cache resulted in a several orders of magnitude improvement in search times in a development environment.

Each wrapper 330, 332 and 334 receives the API calls from the class path manager without the need for changing the class path manager handling of such calls. In other words, the class path manager does not need to be changed from the prior manner in which it directly operated with the class path elements to cause them to be searched. The wrapper handles translation of the APIs into the proper form for searching the element, or the cache for that element if one exists. The wrappers provide a level of indirection to either location services provided by the system if no cache is used for the element corresponding to the wrapper, or they provide indirection to different services to be used to search a cache, such as wrapper 330 providing indirection to services associated with element 318. This permits multiple different caches to be used for different elements, which can be more efficient for different types of elements.

Class Path Manager Operation

Figure 4:
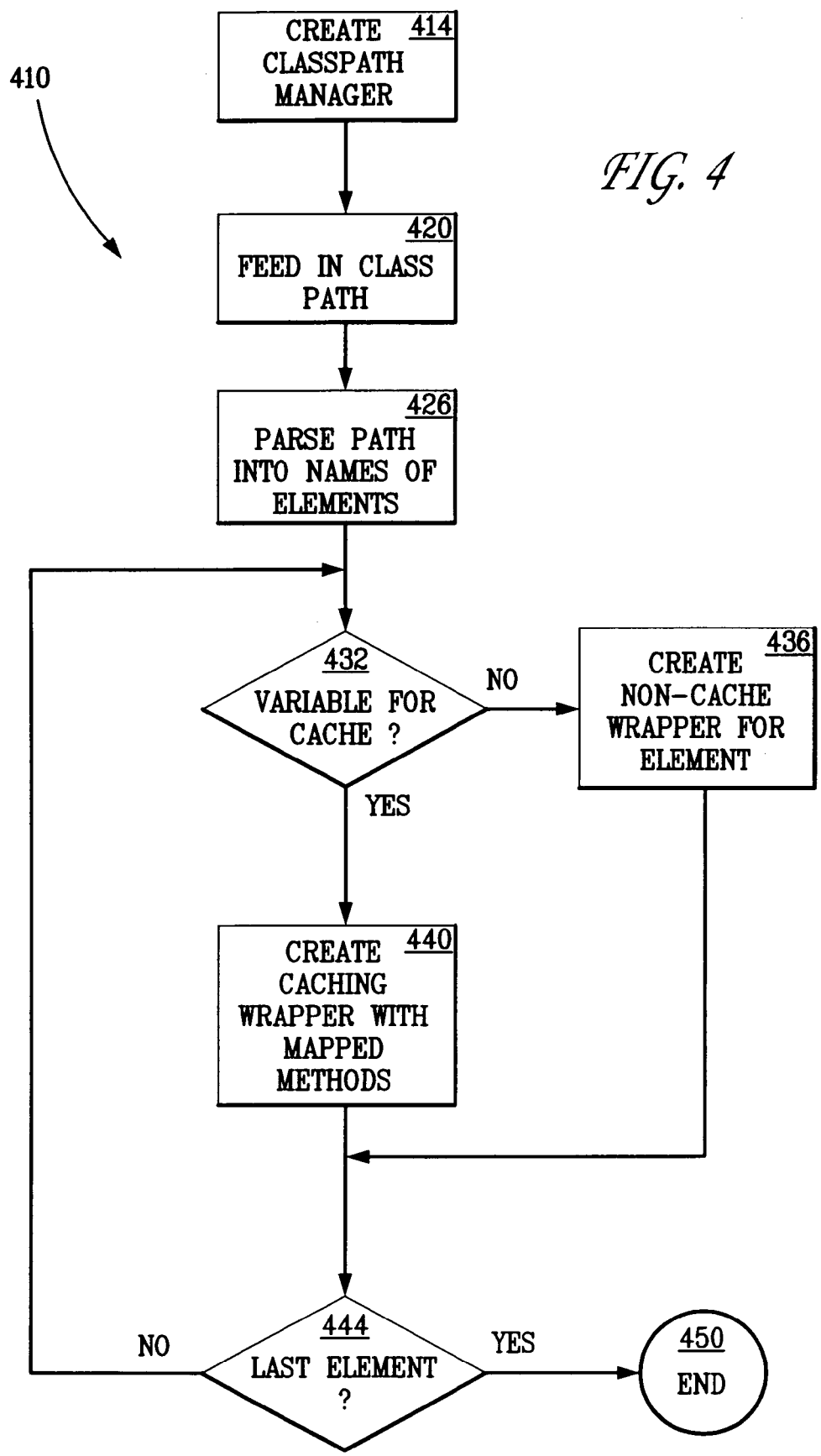
FIG. 4 is a flowchart showing instantiation of the class path manager of FIG. 3.

FIG. 4 is a flow chart which shows a method 410 of instantiating or initial loading of the class path manager 320. At 414, the class path manager is created, and is fed the class path at 420. At 426, the path is parsed into names of elements. At 432, a determination is made whether or not an element is a viable candidate for a cache. Again, this determination can be made based on many factors as discussed above. In one embodiment, the determination is whether the extension of the path name is "zip." Since ZIP files are fairly stable, and determining change is as simple as checking the time stamp of the file and comparing it to the last time stamp, they are excellent candidates for caching. Further, in one embodiment, a package manager provides a ZIP file that contains most of the packages loaded by a user, as it is the default entity for such packages. Furthermore, since it is a ZIP file, it is easy to detect changes to it. Thus, ZIP files tend to comprise a substantial number of the classes in a class path, making caching of them very effective in improving class search and enumeration performance.

If at 432, the element is not a viable candidate for cache, a non-cache wrapper, such as wrappers 332 and 334 in FIG. 3, is created. This type of wrapper simply invokes normal class location services provided by the system. If the element is a viable candidate for cache, a caching wrapper, such as wrapper 330, is created at 440 with method calls mapped from the standard location services to provide transparent indirection to the class path manager 320. Following creation of either type of wrapper, a determination of whether or not the last element has been processed is made at 444. If not, the next element is considered at 432 as to whether or not it is a viable candidate for cache. If the last element has been considered, the process ends at 450.

Figure 5:
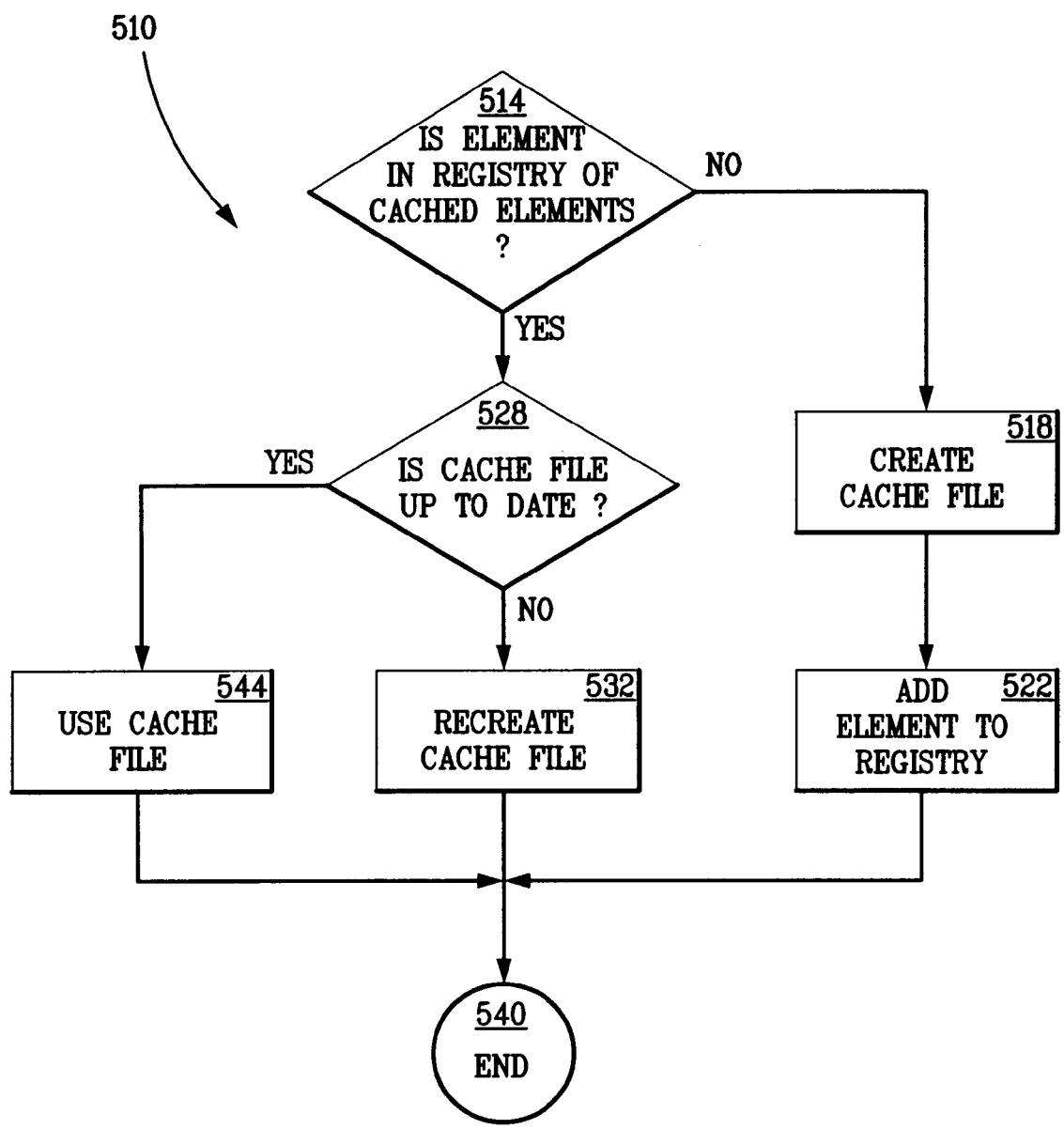
FIG. 5 is a flow chart showing the creation and management of caches for selected elements.

In conjunction with the creation of a wrapper for cacheable elements, a process is followed as indicated generally at 510 in the flowchart of FIG. 5 to create the cache for desired elements. At 514, it is determined whether the element is already in a registry of cached elements. During creation/initialization, the caching root object examines its underlying class path element to determine the name and version of the element, which can be its date/time stamp, or any other value that is guaranteed to be changed if anything contained within it has changed. If not, at 518 a cache file is created as previously described and the element is added to the registry of cached elements at 522. During creation, the class path element is exhaustively searched for all classes, and certain ("interesting") information is read from each class and stored in the cache file. Since this can be time consuming operation, an event can be fired to the user/creator of the JPS instance when a cache file is rebuilt, to enable the user interface to display a message indicating what is happening. If the element is already on the registry, a check is made at 528 to determine if the cache file is up to date. Again, this can be as simple as determining if a last revised time stamp for the element has changed since the cache file was built. It can be any other mechanism depending on the type of element that is being cached in order to determine whether or not the classes in the element have changed since the last cache was generated. If the cache file is not up to date, a new one is generated at 532, and the process ends at 540. If the cache file is up to date, it can be used at 544.

Once the cache file is either deemed valid or recreated, the IRoot method implementations examine the cache file to satisfy search/enumeration requests for classes, rather than looking to the class path element itself. In the rare cases, when non-cached information about a class is requested, the root object then reverts back to the class path element to satisfy the request.

The JPS instances use a list of root objects in the order in which they were created to satisfy external class location requests. For example, a JPS instance can be initialized with a class path that looks something like "Z;D;J", where Z is a ZIP file, D is a directory, and J is the Java Package Manager. In this case, the JPS instance will have a list of three root objects, the first and third of which will be caching root objects, and the second will be a non-caching root object. When a request to find a class is made on the JPS instance, it asks each of these root objects for the class, in order, until the class is found or the list is exhausted.

To monitor whether or not the elements having associated caches have changed during normal use of a development system, in one embodiment a background thread is run. File change notifications are issued by a file system to wake up the thread, which in turn can automatically check either an identified cache for changes, or check them all depending on the granularity of the change notice. The change notifications can also be directed to individual wrappers for initiating update of associated caches, either as received, or at the time that the cache is next needed to find all classes or enumerate them.

Figure 6:
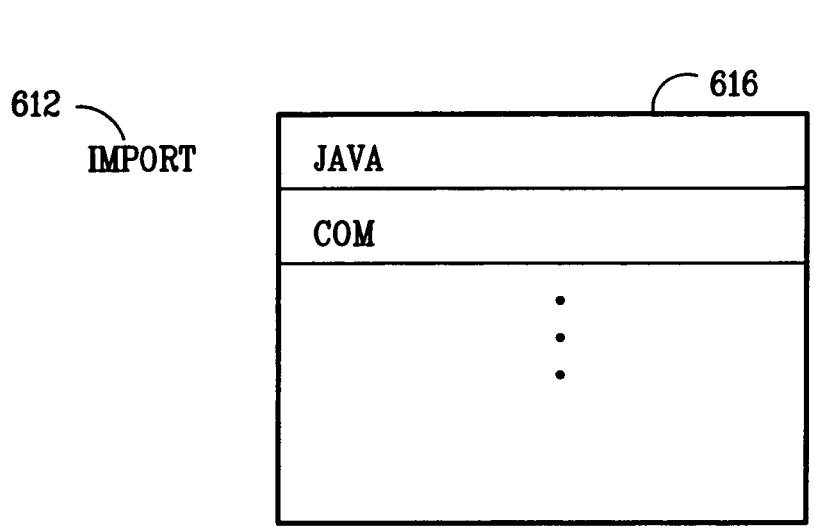
FIG. 6 is a block diagram representation of completion of entry of a class by a user.
Figure 7:
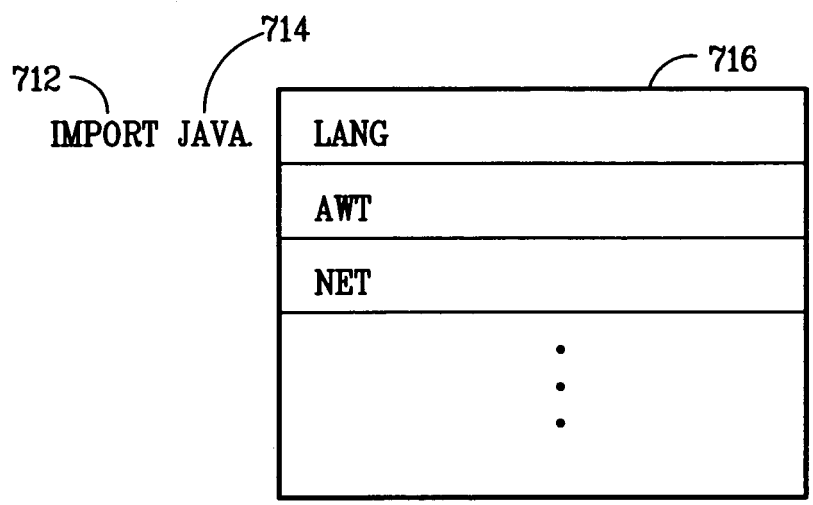
FIG. 7 is a block diagram representation of completion of entry of a class by a user.
Figure 8:
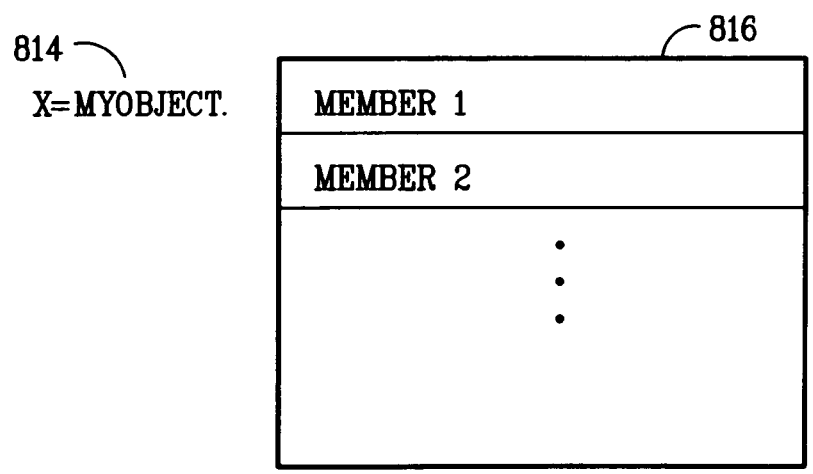
FIG. 8 is a block diagram representation of completion of entry of members of a class by a user.

FIGS. 6, 7 and 8 show various entries made by a user in writing programs and the response of the system incorporating one or more aspects of the present invention. Indicated generally at 610 are user generated characters "IMPORT" 612 typed while using a Visual J++editor, along with a list of top level package classes comprising java, corn and others at 616. Each of the corresponding wrappers, at the point of a space following the IMPORT characters receives a call originating from the code completion function 336 through the class path manager 320. The wrappers know to look for top level classes in the root of each element, and in fact look for classes in the following elements using the search strings C:\classes\*.class and C:\classes\* to obtain both classes and directories. The "*" or "splat" or asterisk character is used as a wild card, resulting in the respective searches for classes and directories.

In FIG. 7, typing the characters "IMPORT Java." at 712 and 714 respectively results in search strings C:\classes\java\*.class and C:\classes\java\* to obtain classes and directories starting with java at 716. These are shown as lang, awt, net and others in FIG. 7.

In FIG. 8, typing the characters "X=myobject." at 814 results in a search for members of the object which has been identified as myobject previously in the program being written by the user. The "." character acts as a delimiter which triggers the completion function.

CONCLUSION

Location of classes is facilitated by caching information about classes in a class path. This cached information provides a much quicker way of searching for a class which is needed for instantiation and execution. The cache is reconstructed when changes to the original information in the class path are detected.

In one aspect of the invention, only selected elements in a class path are cached. These elements are selected as those which have associated mechanisms to provide notification of changes. In this manner, the integrity of the cache can be maintained with little overhead involved in independent tracking of the class path elements. By keeping separate caches, reconstruction of a cache due to a detected change is limited to that cache only. Further the selection criteria can be modified such that only class path elements that are least likely to be changed are cached, and for which changes are easy to detect. This allows selectivity of elements to cache based on the overhead associated with caching the element.

In a further aspect of the invention, a class path manager is used to create caches for selected class path elements on instantiation of the path manager. It first parses the path into names of elements, and then decides whether the element is viable for caching. In one embodiment, only zip files are cached. The class path manager creates a wrapper for each element in the class path as identified by a classpath environment variable. The wrapper is used to provide a level of indirection when calls are made to determine the location of a class. If the element is not one which is viable to cache, standard system services are invoked to perform a search of the path of that element. If the element is one for which caching is viable, a caching wrapper is created which invokes methods to search the cache for that element. The indirection provided by the wrappers allows multiple different types of caches to be provided for elements without increasing the complexity of the class path manager, nor changing the normal calls from applications that need to find the class.

While the invention has been described with respect to Java, it should be noted that it is applicable to other environments which need to identify and/or enumerate files from a large quantity of files. Further, the information cached can be changed in other embodiments. It should merely be sufficient to identify the locations of classes meeting the criteria given the context of invocation of the search. While ZIP files were identified as viable candidates for caching, other types of directories or file structures can also be cached as determined by a weighing of the tradeoffs between increased performance and overhead associated with keeping the cache up to date.

This application is intended to cover any adaptations or variations of the present invention. It is manifestly intended that this invention be limited only by the claims and equivalents thereof.

I claim:

1. A computer-implemented method of locating classes in a class path, the method comprising:
   generating a cache of information relating to the classes in the class path;
   creating a wrapper for selected elements in the class path to provide a level of indirection from application programming interfaces used by a class locator, the wrapper indirection level providing for different caches to be used for the selected elements;
   requesting a search of the class path via the wrapper;
   searching the cache to satisfy the requested search; and
   displaying, on a computer monitor, classes and directories that satisfy the requested search.

2. A computer readable medium having instructions stored thereon for causing a computer to perform the method of claim 1.

3. The method of claim 1 wherein the class path comprises multiple elements, each element having multiple classes stored therein.

4. The method of claim 3 wherein at least one of the elements comprises a ZIP file.

5. A computer-implemented method of locating classes in a multi element class path, the method comprising:
   generating a search request for desired classes within the multi element class path;
   forwarding the search request to a wrapper providing a level of indirection to search the appropriate class path for the search request;
   independently satisfying the request in association with each element in the class path, wherein at least two of the elements have at least two separate caches of information sufficient to satisfy the request for the at least two elements; and
   displaying, on a computer monitor, classes and directories that satisfy the request.

6. A computer readable medium having instructions stored thereon for causing a computer to perform the method of claim 5.

7. The method of claim 5 wherein at least one of the elements comprises a ZIP file.

8. The method of claim 5 wherein the classes comprise Java classes.

9. The method of claim 5 wherein at least one of the elements comprises a Java Package Manager.

10. A computer-implemented method of creating caches for selected elements of a class path, the method comprising:
    parsing the class path into names of elements;
    determining which elements are viable for caching;
    initiating creation of at least two caches for the selected elements and initiating creation of wrappers for each selected elements which is viable, the wrappers providing a level of indirection from application programming interfaces used by a class locator to search classes; and displaying, on a computer monitor, classes and directories that satisfy the search of the classes.

11. The method of claim 10 wherein the viability of an element for caching is dependent on the ease of tracking where elements have had changes in them.

12. The method of claim 10 wherein the viability of an element for caching is determined based on it being a predetermined type.

13. The method of claim 10 and further comprising checking a registry to see if the element already has a cache associated with it.

14. The method of claim 13 and further comprising determining if an existing cache is up to date.

15. A computer readable storage medium having instructions stored thereon, which when executed, causes a computer to perform a method of locating classes in a multi element class path, the method comprising:

generating a search request for desired classes within the multi element class path;

forwarding the search request to a wrapper providing a level of indirection to search the appropriate class path for the search request;

independently satisfying the request in association with each element in the class path, wherein at least two of the elements have at least two separate caches of information sufficient to satisfy the request for the at least two elements, wherein changes to the element result in recreation of the cache; and displaying, on a computer monitor, classes and directories that satisfy the request.

16. The computer readable storage medium of claim 15 and further having instructions for causing the computer to perform:

checking a date/time stamp on the element having the cache of information to determine if the cache is up to date.

* * * * *